United States Patent
Martinez et al.

(10) Patent No.: US 8,985,601 B1
(45) Date of Patent: Mar. 24, 2015

(54) DOLLY FOR TRANSPORTING SHEET MATERIALS

(71) Applicants: Carlos L. Martinez, Orlando, FL (US); Charles R. Figueroa, Apollo Beach, FL (US)

(72) Inventors: Carlos L. Martinez, Orlando, FL (US); Charles R. Figueroa, Apollo Beach, FL (US)

(*) Notice: Subject to any disclaimer, the term of this patent is extended or adjusted under 35 U.S.C. 154(b) by 0 days.

(21) Appl. No.: 14/194,019

(22) Filed: Feb. 28, 2014

Related U.S. Application Data

(63) Continuation of application No. 13/303,453, filed on Nov. 23, 2011, now Pat. No. 8,695,997.

(60) Provisional application No. 61/416,849, filed on Nov. 24, 2010.

(51) Int. Cl.
*B62B 3/00* (2006.01)

(52) U.S. Cl.
CPC ...................................... *B62B 3/002* (2013.01)
USPC ....................................................... 280/79.7

(58) Field of Classification Search
USPC ........ 280/47.34, 87.01, 87.021, 47.35, 79.11, 280/79.3, 79.7
See application file for complete search history.

(56) References Cited

U.S. PATENT DOCUMENTS

| | | | |
|---|---|---|---|
| 2,947,565 A | 8/1960 | Wood | |
| 7,992,883 B2 * | 8/2011 | Brandon | 280/79.7 |

* cited by examiner

*Primary Examiner* — Jeffrey J Restifo
*Assistant Examiner* — Erez Gurari
(74) *Attorney, Agent, or Firm* — Ronald E. Smith; Smith & Hopen, P.A.

(57) ABSTRACT

A dolly includes a flat, horizontally disposed base supported at its corners by wheels. First and second vertical support walls are mounted to opposite ends of the base in transversely disposed relation to a longitudinal axis of the base. Both support walls have a vertical back edge that extends a first predetermined height and a vertical front edge, parallel to the vertical back edge, that extends to a second predetermined height less than the first predetermined height. Each support wall includes a horizontal step extending a predetermined distance from an uppermost end of the vertical front edge towards the vertical back edge. Each support wall includes a slab-supporting inclined edge that extends from an inboard end of its horizontal step to an uppermost end of its vertical back edge. A single individual rotates a slab from the dolly onto a countertop without lifting the slab from the dolly.

1 Claim, 1 Drawing Sheet

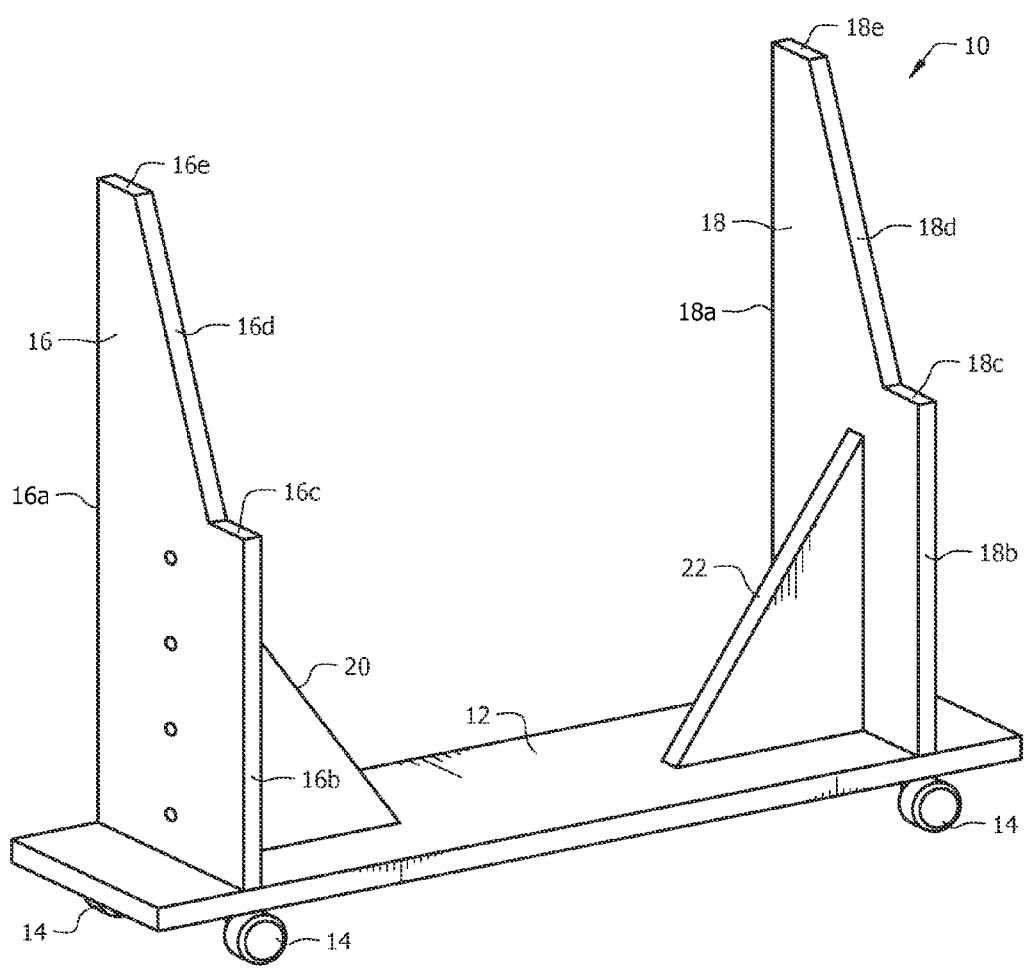

DOLLY FOR TRANSPORTING SHEET MATERIALS

CROSS-REFERENCE TO RELATED APPLICATIONS

This application is a continuation and claims priority of U.S. nonprovisional patent application Ser. No. 13/303,453, entitled "Dolly for Transporting Sheet Materials" filed by the same inventor on Nov. 23, 2011, now under Notice of Allowance, and U.S. provisional patent application No. 61/416,849, having the same title and filed by the same inventor on Nov. 24, 2010. Both of said applications are hereby incorporated by reference into this disclosure.

BACKGROUND OF THE INVENTION

1. Field of the Invention

This invention relates, generally, to the art of transporting sheet materials. More particularly, it relates to a dolly that enables a single person to transport and unload heavy sheet materials.

2. Description of the Prior Art

Conventional dollies that transport heavy items of sheet material such as marble slabs require two (2) workers. The slab is transported on edge, tilted slightly from the vertical, and the lowermost end of the slab is positioned near a floor surface so that lifting the slab from the dolly requires extensive bending and lifting. It also takes two people to position the slab onto a horizontal flat surface to be covered by the slab.

U.S. Pat. No. 2,947,565 to Wood discloses a dolly capable of transporting various materials. It may be used to carry a large flat slab formed of marble or other heavy, easily breakable material. However, a single person working alone cannot remove such a large flat slab from the Wood dolly.

A first embodiment of the Wood dolly includes a flat vertical wall having a V-shaped cut out formed in it that could hold such a slab when paired with a similar flat vertical wall. The V-shape forms a trough that prevents the slab from sliding during transportation of the dolly. However, a single person of ordinary strength cannot lift a heavy slab from such a trough. Moreover, the trough prevents a single worker from rotating the slab into a horizontal plane onto a horizontal surface such as table top.

A second embodiment of the Wood dolly includes a flat vertical wall forming a flat frusto-conical shape so that two heavy slabs could be carried at the same time. That embodiment includes an inclined step near the bottom of the flat frusto-conical wall that forms a V-shape and thus a trough. Just as in the first embodiment, the V-shaped trough requires a worker to lift the slab from the trough and the trough also prevents the worker from rotating the slab onto a horizontal table top.

Wood discloses multiple further embodiments, but all of them include a trough which prevents a single worker from lifting a heavy slab therefrom and from rotating the slab onto a horizontal table top.

There is a need for a dolly that enables a single person to transport a marble slab or other item of sheet material and a single person to transfer the slab or other item from the dolly to a flat horizontal surface to be covered.

However, in view of the art considered as a whole at the time the present invention was made, it was not obvious to those of ordinary skill in the art how the needed dolly could be provided.

SUMMARY OF THE INVENTION

The long-standing but heretofore unfulfilled need for an improved dolly is now met by a new, useful, and non-obvious invention.

The novel dolly includes a flat, horizontally disposed base plate supported at its corners by conventional wheels such as caster wheels. A first support wall is mounted to the flat base plate near a first end thereof in vertical, upstanding relation thereto and a second support wall is mounted to the flat base plate near a second end thereof in upstanding, vertical relation thereto in parallel, longitudinally spaced alignment with the first support wall.

A first brace supports the first support wall and a second brace supports the second support wall. The braces are mounted on the base plate in coincidence with a longitudinal axis of symmetry of the base plate.

The first support wall has a vertical back edge that extends a first predetermined height and a vertical front edge that extends to a second predetermined height less than the first predetermined height and preferably less than the height of a conventional countertop.

The second support wall also has a vertical back edge that extends said first predetermined height and a vertical front edge that extends to a second predetermined height less than said first predetermined height and preferably less than the height of a conventional countertop.

The first support wall has a horizontal flat surface or step formed therein at the upper end of its vertical front edge. A backwardly or rearwardly inclined edge extends from an inward or inboard end of the step to an uppermost flat edge of the first support wall.

The second support wall also has a horizontal flat surface or step formed therein at the upper end of its vertical front edge. A backwardly or rearwardly inclined edge extends from an inward or inboard end of said step to an uppermost flat edge of the second support wall.

The slab rests against the respective backwardly or rearwardly inclined edges of the first and second support walls during transport. The horizontal step formed in each support wall enables a single worker to rotate the slab from its rearwardly inclined position to a vertical position and thereafter to a forwardly inclined position and thereafter into a horizontal plane so that the slab at least in part overlies a horizontal table top. The single worker can then slide the slab in a horizontal plane so that it covers the table top. The respective horizontal steps formed in the support walls enable such rotation and the worker is not required to lift the slab at any time during the unloading process.

The primary object of this invention is to provide a dolly capable of transporting large items of sheet material, including heavy items of sheet material, which can be unloaded by a single person in the absence of bending and heavy lifting.

Further objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which:

The FIGURE is a perspective view of the preferred embodiment;

DETAILED DESCRIPTION OF THE PREFERRED EMBODIMENT

The FIGURE depicts an illustrative embodiment of the novel dolly which is denoted as a whole by the reference numeral 10.

Flat base plate 12 is supported at its corners by wheels 14 in a conventional manner. First support wall 16 is mounted to said flat base plate 12 near a first end thereof in upstanding relation thereto and second support wall 18 is mounted to said flat base plate near a second end thereof in upstanding relation thereto so that it is parallel to and longitudinally aligned with first support wall 16.

Flat, triangular braces 20 and 22 support first and second support walls 16, 18, respectively. Said braces are preferably mounted on the longitudinal axis of symmetry of base plate 12.

Each support wall 16, 18 has a vertical back edge 16a, 18a that extends a first predetermined height and a vertical front edge 16b, 18b that extends a second predetermined height less than said first predetermined height. The second predetermined height is preferably less than the height of a typical table or countertop.

Each support wall 16, 18 has a horizontal flat surface or step 16c, 18c formed therein at the upper end of each vertical front edge 16b, 18b, and a backwardly inclined edge 16d, 18d that extends from an inboard or rearward end of associated steps 16c, 18c to an outboard or forward end of uppermost flat 16e, 18e, respectively, said flats 16s, 18e being formed in respective uppermost ends of said support walls 16, 18.

A heavy item of sheet material such as a marble slab, not depicted in the FIGURE, or a lighter item of sheet material such as a sheet of drywall, plywood, glass, or the like, is supported on edge by steps 16c, 18c and leans rearwardly against inclined edges 16d, 18d when being transported. Suitable clamps, not depicted in the FIGURE, are used to hold the item of sheet material in position, there being different commercially-available clamps used for differing items of sheet material such as marble, drywall, plywood, glass, and the like.

Upon arriving at the counter or table top to be covered by such slab, the worker removes the clamps and rotates the slab as the slab rests on the respective horizontal steps until the slab at least in part overlies the table top to be covered. The slab is then slid in a horizontal plane until the table top is covered as desired. The slab is not lifted at any point of the unloading process.

It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A dolly, comprising:
   a flat, horizontally disposed base plate supported at its corners by wheels;
   a first support wall mounted to said flat base plate near a first end thereof in upstanding relation thereto, said first support wall disposed in a vertical plane that is transversely disposed relative to a longitudinal axis of said base plate;
   a second support wall mounted to said flat base plate near a second end thereof in upstanding relation thereto in parallel and longitudinally-spaced apart relation with said first support wall;
   a first brace for supporting said first support wall;
   a second brace for supporting said second support wall;
   said first and second braces being mounted on said base plate in coincidence with said longitudinal axis of symmetry of said base plate in perpendicular relation to said first and second support walls, respectively;
   said first support wall having a vertical back edge that extends a first predetermined height to an uppermost end and a vertical front edge, parallel to said vertical back edge, that extends to a second predetermined height that is less than the first predetermined height of said vertical back edge;
   a flat formed in a horizontal plane in said first support wall at said uppermost end;
   said first support wall including a horizontal step extending a predetermined distance from an uppermost end of said vertical front edge towards said vertical back edge;
   said first support wall including an inclined edge that extends from an inboard end of said horizontal step to an outboard end of said flat;
   said second support wall having a vertical back edge that extends said first predetermined height to an uppermost end of said second support wall and a vertical front edge, parallel to said vertical back edge of said second support wall, that extends to said second predetermined height;
   a flat formed in a horizontal plane in said second support wall at said uppermost end of said second support wall;
   said second support wall including a horizontal step extending a predetermined distance from an uppermost end of said vertical front edge of said second support wall toward said back edge of said second support wall; and
   said second support wall including an inclined edge that extends from an inboard end of said horizontal step of said second support wall to an outboard end of said flat formed in said uppermost end of said second support wall.

* * * * *